Nov. 22, 1955  E. L. HEBERT  2,724,259
MOTOR VEHICLE TRANSMISSION LOCK
Filed Nov. 18, 1952
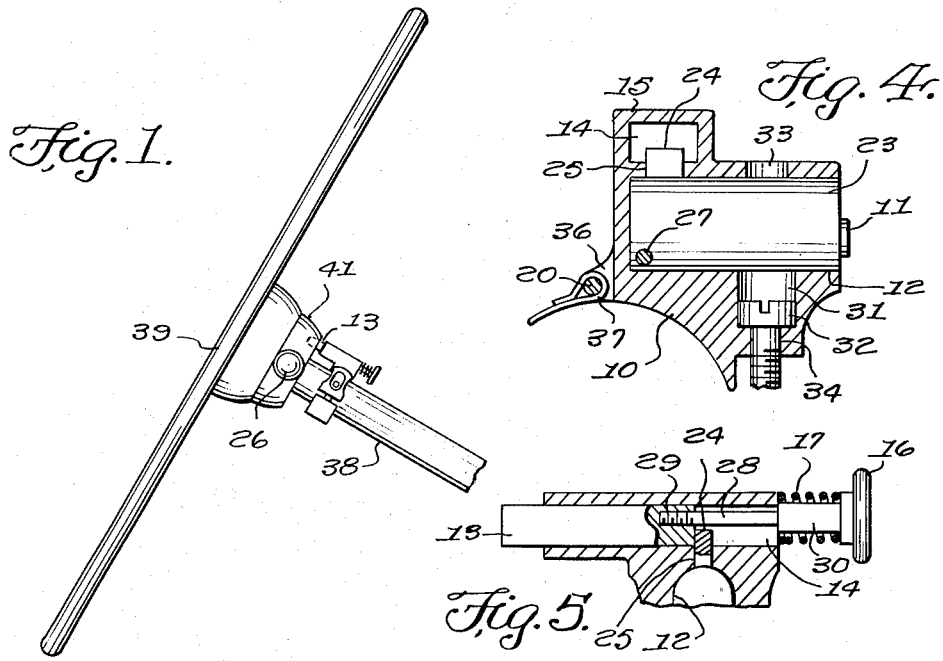
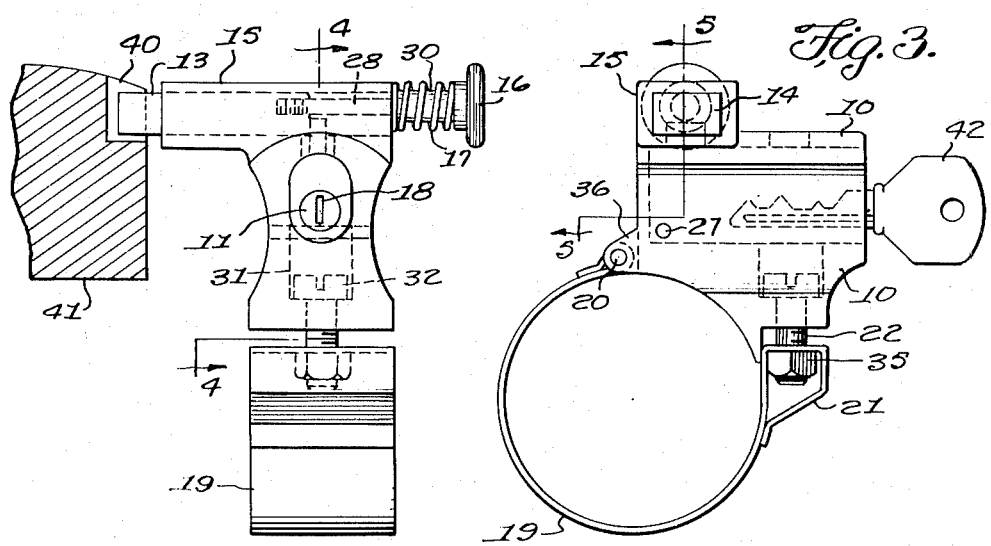
INVENTOR.
Edward L. Hebert,
BY Victor J. Evans & Co.
ATTORNEYS

United States Patent Office 2,724,259
Patented Nov. 22, 1955

2,724,259

MOTOR VEHICLE TRANSMISSION LOCK

Edward L. Hebert, Biddeford, Maine

Application November 18, 1952, Serial No. 321,099

1 Claim. (Cl. 70—202)

This invention relates to motor vehicle locks of the type used in combination with shift levers of the transmission of a vehicle, and in particular a lock clamp on the steering wheel post and positioned to prevent movement of the shift lever.

The purpose of this invention is to provide a motor vehicle lock that may readily be installed and that positively prevents operation of the transmission gears or other elements.

Various types of auxiliary locks have been provided for use in combination with gear shift levers, ignition circuits and other parts of motor vehicles, however, substantially all locks of this type require the services of a mechanic or specialist to install. With this thought in mind this invention contemplates a lock for preventing shifting of the speed changing elements of a motor vehicle and that may readily be clamped on the steering wheel post of the vehicle.

The object of this invention is, therefore, to provide means for forming a motor vehicle lock whereby the body of the lock may readily be clamped on the steering wheel post of a motor vehicle and wherein the lock is adapted to be positioned to prevent operation of shift levers mounted on the steering wheel post.

Another object of the invention is to provide an auxiliary or safety lock for motor vehicles that may readily be installed on vehicles now in use without engaging parts thereof.

A further object of the invention is to provide an auxiliary or safety lock for motor vehicles in which the lock is of a simple and economical construction.

With these and other objects and advantages in view the invention embodies a lock having a body with a key actuated cylinder therein and with the body provided with a strap forming a clamp whereby the body may readily be clamped on a steering wheel post, with a lock bolt adapted to extend from the body, actuated by the lock cylinder for releasing gear shift elements and adapted to be manually actuated to prevent operation of the gear shift elements.

Other features and advantages of the invention will appear from the following description taken in connection with the drawing, wherein:

Figure 1 is a side elevational view showing the steering wheel of a motor vehicle with the lock of this invention mounted on the post of the steering wheel and positioned to engage gear shift levers carried by the post.

Figure 2 is a side elevational view, similar to that shown in Figure 1 with the parts shown on an enlarged scale and showing a portion of a hub of a gear or operating shift lever broken away and shown in section.

Figure 3 is an end elevational view of the lock with the parts as shown in Figure 2.

Figure 4 is a cross section through the body of lock taken on line 4—4 of Figure 2.

Figure 5 is a longitudinal section through the lock bolt mounting taken on line 5—5 of Figure 3.

Referring now to the drawing wherein like reference characters denote corresponding parts the improved motor vehicle transmission lock of this invention includes a lock body 10 having a lock cylinder 11 positioned in an opening 12 therein, a lock bolt 13 slidably mounted in an opening 14 in a section 15 of the body, a button 16 for actuating the lock bolt to the locking position, a spring 17 for returning the lock bolt after it is released by a key positioned in a key slot 18 in the cylinder, and a band 19, one end of which is pivotally connected to the body 10 with a pin 20 and the opposite end of which is provided with a loop 21 by which it is secured to the body 10 with a bolt 22.

The body 10 is formed particularly as illustrated in Figures 2, 3 and 4 and a conventional lock cylinder 11, which is carried by a plug 23, in the opening 12 is provided with a locking lug 24 that is positioned to extend through an opening 25 in the body whereby the lug is adapted to project into the opening 14 to engage the end of the bolt 13, as shown in Figure 5 thereby retaining the bolt in the position of locking the shift levers, as indicated by the numeral 26.

The plug 23 is retained in the body 10 with a pin 27 and the lock bolt 13 is secured to the button 16 with a stem 28, one end of which is threaded into the bolt 13, as shown at the point 29, and the other end, on which the button 16 is positioned, is provided with an enlarged section 30 around which the spring 17 is positioned and from which the stem 28 extends.

The body 10 is provided with an opening 31 in which the head 32 of the bolt 22 is positioned and, as shown in Figure 4, the bolt is retained in the body by the plug 23. The body is also provided with an opening 33 that is aligned with the opening 31 whereby a screw driver may be inserted into a screw driver slot in the head 32 of the bolt 22.

The bolt 22 extends through an opening 34 in the body and the extended threaded end thereof extends into the loop 21 on the end of the band 19 whereby a nut 35 positioned in the loop 21 may be threaded on the end of the bolt.

The body 10 is provided with ears 36 between which one end of the band 19 is positioned and the pin 20 extends through the ears 36 and also through a socket 37 formed on the end of the band.

With the parts formed in this manner the lock body 10 may be secured on a post 38 of a steering wheel 39 with the lock bolt 13 positioned to extend into a notch 40 in a hub 41 of the shift lever 26, and the lock bolt 13, which is usually held in the retracted position in the body by the spring 17, may be moved forwardly by pressing the button 16 until the end of the bolt 13 is positioned in the notch 40 and until the lug 24 is extended to the position shown in Figure 5 whereby the lock bolt 13 is secured in the extended or locking position.

When it is desired to release the shift lever, a key, as indicated by the numeral 42 is inserted in the key slot 18 of the cylinder 11 and by turning the key the lug 24 is withdrawn whereby the spring 17 snaps the lock bolt 13 to a retracted position in the opening 14.

The device may also be used in different positions on a motor vehicle and may be used for locking other parts thereof.

It will be understood that modifications, within the scope of the appended claim, may be made in the design and arrangement of the parts without departing from the spirit of the invention.

What is claimed is:

In a motor vehicle lock, the combination which comprises a body, a plug mounted in said body, a key actuated lock cylinder mounted in said plug, said key actuated lock cylinder having a lug adapted to extend therefrom with the lug positioned to extend to an opening extended through the body at right angles to said lock cylinder, a lock bolt slidably mounted in said opening and positioned to be engaged by the lug of the key actuated cylinder for retaining the lock bolt in an extended position, a knob attached to one end of said lock bolt, a spring mounted on said knob for returning said lock bolt upon release of the lock bolt by the lug of the key actuated cylinder, and a band pivotally mounted at one end, to said body and having a loop on the opposite end positioned to receive a bolt mounted in the body providing a clamp for mounting the lock body on a steering wheel post of a motor vehicle with the lock bolt positioned in parallel relation to said steering wheel post to prevent operation of a shift lever on said post.

References Cited in the file of this patent

UNITED STATES PATENTS

| | | |
|---|---|---|
| 1,347,564 | Turner | July 27, 1920 |
| 1,375,386 | Hale et al. | Apr. 19, 1921 |
| 1,377,100 | Smith | May 3, 1921 |
| 1,436,585 | Gaynor | Nov. 21, 1922 |